2,305,229

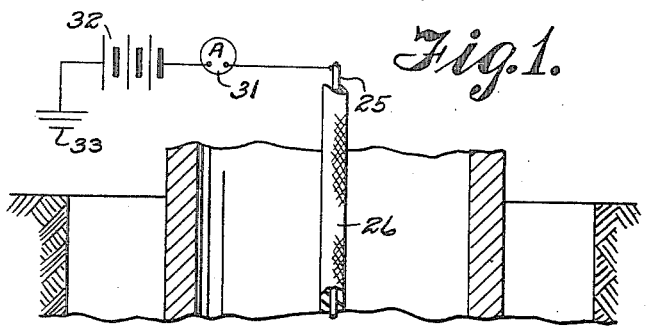
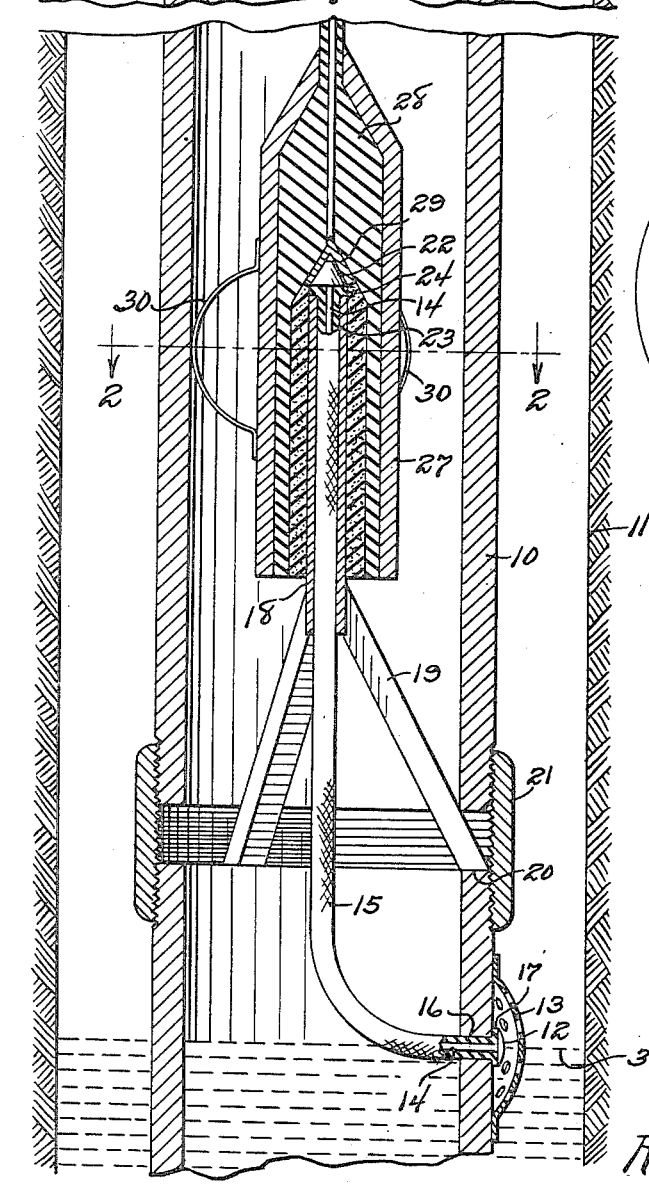
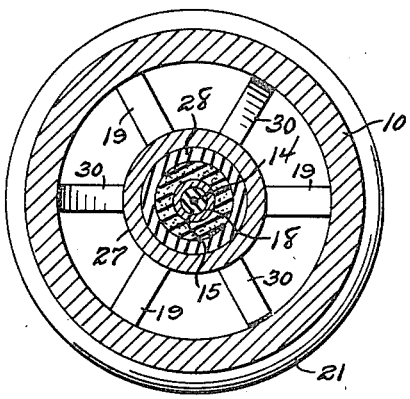
Reuben D. Alexander
INVENTOR
BY Victor J. Evans & Co.
ATTORNEYS Patented Dec. 15, 1942

UNITED STATES PATENT OFFICE 2,305,229

SIGNAL APPARATUS

Reuben D. Alexander, Alva, Okla.

Application December 8, 1941, Serial No. 422,151

4 Claims. (Cl. 177—311)

This invention relates to signal apparatus and has for an object to provide apparatus of this type which will include an insulated electrical connection with an electrode on the outside of oil well tubing.

In many cases, particularly in the process of acidizing an oil well, it is desirable to ascertain the fluid level outside the tubing, or to determine when the acid solution reaches a predetermined level, and while this may be done by suspending an electrode in the well between the tubing and casing on an insulated conductor cable, such cable frequently becomes fouled with the tubing and in many cases cannot be recovered.

An object of the present invention is to obviate the above disadvantage by the provision of an insulated electrode on the tubing exposed to fluid contact exteriorly of the tubing, and to provide a conductor cable which may be lowered into the tubing and will make an insulated connection with the electrode, the cable being afterward removed from the tubing leaving the tubing unobstructed and in condition to function.

A further object is to provide appartaus of this character which will be formed of a few strong, simple and durable parts, which will be inexpensive to manufacture, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawing forming a part of this specification:

Figure 1 is a longitudinal section view showing well tubing equipped with an insulated electrode exposed exteriorly of the tubing and a conductor cable equipped with an insulated socket member adapted to be lowered into engagement with an exposed prong member which is supported in the tubing and is carried by a cable connected to the electrode, in accordance with the invention.

Figure 2 is a cross section view taken on the line 2—2 of Figure 1.

Reference now to the drawing in which like characters of reference designate similar parts in the various views, 10 designates tubing of an oil well 11. In carrying out the invention an electrode 12 is disposed exteriorly of the tubing at the liquid level depth and is protected by a perforated shield 13. The electrode is secured to the conductor 14 of an insulated cable 15, the latter being engaged through an opening 16 in the tubing and being provided exteriorly of the tubing with an insulating washer 17 so that the electrode is insulated from the tubing. The cable is directed upwardly to extend along the axis of the tubing and is supported in this position by a metal sleeve 18 which is provided with tripod legs 19 adapted to be supported on the upper end 20 of one of the pipe sections at a joint 21 of the tubing. A conical prong member 22 formed of metal is secured to the upper end of the conductor 14 of the cable and is insulated from the sleeve by an insulating plug 23 fitted into the bore of the sleeve and provided with an insulating washer 24 which is disposed between the prong and the upper edge of the sleeve.

In further carrying out the invention the conductor 25 of an insulated cable 26 is provided with a metal sleeve 27 of sufficient diameter to be easily dropped over the sleeve 18 of the fixed insulated cable 15 and leave a space between both sleeves for reception of semiliquid insulating material such as hard oil, cup grease, or the like, indicated at 28. The lower end of the sleeve 27 is open and may if desired be covered with frangible material to prevent escape of the insulating material 28.

The conductor 25 is equipped with a conical socket member 29 formed of metal and disposed midway of the ends of the sleeve 27, adapted to receive and make good electrical connection with the conical prong 22 of the fixed insulated cable 15 when the cable 26 is lowered into the tubing 10.

For centering the sleeve 27 in the tubing while it is being lowered and withdrawn, a plurality of arcuate guide fingers 30 are disposed in an annular series around the sleeve 27 and engage the inner surface of the tubing, see Figure 2, these fingers assuring that the conical socket member 29 will be lowered accurately into electrical engagement with the prong member 22.

The upper end of the conductor 25 of the insulated cable 26 is connected through an ammeter 31, to a battery 32 one side of which is grounded as shown at 33.

In operation the insulated cable 26 is lowered into the tubing 10 until the conical socket member 29 receives and electrically engages the conical prong member 22, the excess insulating material 28 being forced out of the sleeve 27 as the sleeve 18 enters the former. Thus a perfectly sealed and insulated electrical connection is made and will remain in this condition even under great pressure. When water or other conductor fluid level indicated at 34, reaches the electrode in the signal circuit will be closed through the fluid and this will be indicated on the ammeter 31. When the work requiring the use of the apparatus has been completed the insulating cable 25 with its attachments is withdrawn.

From the above description it is thought that the construction and operation of the invention will be fully understood without further explanation.

What is claimed is:

1. The combination with well tubing of a section of insulated conductor cable engaged through an opening in the tubing and terminating in an electrode exposed outside of the tubing, a conical conductor prong member connected to the upper end of the conductor of the cable, a sleeve on the cable, said prong member being insulated from said sleeve, means securing the sleeve to the tubing to permanently support the section of conductor cable to extend axially upward in the tubing, a second section of insulated conductor cable adapted to be lowered into the tubing, a metal sleeve on the lower end of the second named cable, semiliquid insulating material in the second sleeve, the second sleeve being open at the bottom to receive the first named sleeve and conical prong member, a conical conductor socket member on the lower end of the conductor of the second named cable adapted to receive the prong member when the second named cable is lowered into the tubing, the excess semiliquid insulating material being forced out of the open bottom of the second named sleeve during telescopic movement of the sleeves of both conductor cables to permit good electrical contact between the prong member and socket member, means carried by the second named sleeve for centering the second named sleeve in the tubing and for guiding the socket member accurately into engagement with the prong member, a source of electricity grounded on one side, and an electrically operated indicating device connected to the other side of the source of electricity and to the conductor of the second named insulated cable.

2. The structure as of claim 1 and in which the means for securing the sleeve to the tubing comprises a plurality of tripod legs secured to the sleeve and supported on the upper end on one of the pipe sections at a joint of the tubing.

3. The structure as of claim 1 and in which the means for centering and guiding the socket member accurately into engagement with the prong member comprises a plurality of arcuate guide fingers disposed in an annular series around the sleeve of the second named section of insulated conductor cable adapted to engage the inner surface of the tubing during lowering of said cable into the tubing.

4. The combination with well tubing of a section of insulated conductor cable engaged through an opening in the tubing and terminating in an electrode exposed outside of the tubing, a conical conductor prong member connected to the upper end of the conductor of the cable, a sleeve on the cable, said prong member being insulated from said sleeve, means securing the sleeve to the tubing to permanently support the section of conductor cable to extend axially upward in the tubing, a second section of insulated conductor cable adapted to be lowered into the tubing, a metal sleeve on the lower end of the second named cable, the second sleeve being open at the bottom to receive the first named sleeve and conical prong member, a conical conductor socket member on the lower end of the conductor of the second named cable adapted to receive the prong member when the second named cable is lowered into the tubing, means carried by the second named sleeve for centering the second named sleeve in the tubing and for guiding the socket member accurately into engagement with the prong member, a source of electricity grounded on one side, and an electrically operated indicating device connected to the other side of the source of electricity and to the conductor of the second named insulated cable.

REUBEN D. ALEXANDER.